(12) United States Patent
Caronni et al.

(10) Patent No.: US 8,108,547 B1
(45) Date of Patent: Jan. 31, 2012

(54) SYMBOLIC LINKS IN A DISTRIBUTED SYSTEM

(75) Inventors: Germano Caronni, Menlo Park, CA (US); Raphael J. Rom, Palo Alto, CA (US); Glenn Carter Scott, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1885 days.

(21) Appl. No.: 11/055,300

(22) Filed: Feb. 10, 2005

(51) Int. Cl.
*G06F 13/00* (2006.01)
(52) U.S. Cl. ........................................ 709/238; 709/245
(58) Field of Classification Search .................. 709/238, 709/245
See application file for complete search history.

(56) References Cited

U.S. PATENT DOCUMENTS

| | | | |
|---|---|---|---|
| 2002/0091857 A1* | 7/2002 | Conrad et al. | 709/238 |
| 2003/0041141 A1* | 2/2003 | Abdelaziz et al. | 709/223 |
| 2008/0034108 A1* | 2/2008 | Chapweske | 709/234 |

OTHER PUBLICATIONS

A. Adya, et al.; "Farsite: Federated, Available, and Reliable Storage for an Incompletely Trusted Environment"; Proceedings of the 5th Symposium on Operating Systems and Design Implementation OSDI; Dec. 2002 (14 pages).
I. Clarke, et al.; "Freenet: A Distributed Anonymous Information Storage and Retrieval System"; Lecture Notes in Computer Science; 2000 (21 pages).
J. Kubiatowicz, et al.; "OceanStore: An Architecture for Global-Scale Persistent Storage"; Proceedings of ACM ASPLOS; Nov. 2000 (12 pages).
A. Rowstron, et al.; "Storage Management and Caching in PAST, a Large-Scale, Peristent Peer-to-Peer Storage Utility"; Symposium on Operating Systems Principles; Oct. 2001 (13 pages).
S. Quinlan, et al.; "Venti: A New Approach to Archival Storage"; Proceedings of the FAST 2002 Conference on File and Storage Technologies; First USENIX Conference on File and Storage Technologies; Jan. 2002 (14 pages).
A. Muthitacharoen, et al.; "Ivy: A Read/Write Peer-to-Peer File System"; Proceedings of the 5th USENIX Symposium on Operating Systems Design and Implementation (OSDI '02); Dec. 2002 (23 pages).
F. Dabek, et al.; "Towards a Common API for Structured Peer-to-Peer Overlays"; Proceedings of 2nd International Workshop on Peer-to-Peer Systems (IPTPS '03), Feb. 2003 (11 pages).
I. Stoica, et al.; "Chord: A Scalable Peer-to-Peer Lookup Service for Internet Applications"; Proceedings of the SIGCOMM 2001 Conference on Applications, Technologies, Architectures, and Protocols for Computer Communications; Aug. 2001 (12 pages).
B. Zhao, et al.; "Tapestry: A Resilient Global-Scale Overlay for Service Deployment"; IEEE Journal on Selected Areas in Communications; Jan. 2004 (15 pages).

(Continued)

*Primary Examiner* — Kenneth R Coulter
(74) *Attorney, Agent, or Firm* — Osha • Liang LLP

(57) ABSTRACT

A method for re-routing a request in a distributed system, that includes sending the request for an originating object, receiving the request at a root node of the originating object, determining whether the root node comprises a first forwarding pointer associated with the originating object, determining a first target object using the first forwarding pointer, if the first forwarding pointer is associated with the originating object, and re-routing the request to the first target object, wherein the distributed system implements an overlay network for message delivery.

23 Claims, 4 Drawing Sheets

OTHER PUBLICATIONS

A. Rowstron, et al.; "Pastry: Scalable, Decentralized Object Location and Routing for Large-Scale Peer-to-Peer Systems"; Lecture Notes in Computer Science; 2001 (22 pages).

C. Greg Plaxton, et al.; "Accessing Nearby Copies of Replicated Objects in a Distributed Environment"; ACM Symposium on Parallel Algorithms and Architectures, Jun. 1997 (23 pages).

M. Castro, et al.; "Practical Byzantine Fault Tolerance"; Symposium on Operating Systems Design and Implementation; Feb. 1999 (14 pages).

D. B. Terry, et al.; "Managing Update Conflicts in Bayou, a Weakly Connected Replicated Storage System"; Proceedings of the Fifteenth ACM Symposium on Operating Systems Principles; Dec. 1995 (12 pages).

D. Boneh, et al.; "Efficient Generation of Shared RSA Keys"; Journal of the ACM; 2001 (21 pages).

Y. Frankel, et al.; "Robust Efficient Distributed RSA-Key Generation"; Proc. $30^{th}$ Annual ACM Symposium on Theory of Computing (STOC); May 1998 (10 pages).

\* cited by examiner

SYMBOLIC LINKS IN A DISTRIBUTED SYSTEM

BACKGROUND

A distributed system typically includes a number of interconnected nodes. The nodes typically include a processor and memory (e.g., Random Access Memory (RAM)). In addition, the nodes also include the necessary hardware and software to communicate with other nodes in the distributed system. The interconnected nodes may also communicate with each other using an overlay network. Nodes belonging to the overlay network route and/or deliver messages between each other using the underlying networking infrastructure (e.g., Internet Protocol (IP) and Transmission Control Protocol (TCP), etc.). While the underlying network infrastructure has the information and capability to directly route messages between specific computers, overlay networks typically maintain only partial routing information and rely on successive forwarding through intermediate nodes in order to deliver a message to its final intended destination.

One common use for overlay networks is to build distributed hash tables (DHT). In one implementation, each node in the overlay network is associated with a Globally Unique Identifier (GUID) and stores a part of the DHT. When a node (i.e., the requesting node) requires a piece of data stored on a node (i.e., a target node) in the overlay network, the requesting node determines the GUID associated with target node, which contains the requested data. The requesting node then queries its routing table entries (i.e., the DHT entries) to find the node (i.e., an intermediate node) with the GUID closest to the target node's GUID. The request is then forwarded to the intermediate node. The intermediate node follows the same process, comparing the target node's GUID with the intermediate node's routing table entries. The aforementioned process is repeated until the target node is reached. Typically, the overlay network maintains enough information in the DHT to determine the appropriate intermediate node.

To store data in the aforementioned overlay network, the data is loaded onto a particular node (i.e., a target node) in the overlay network. Further, the data is associated with a GUID. The node that stores the data subsequently publishes the presence of the GUID on the node. Another node (i.e., the root node) in the network stores in its DHT the necessary information to indicate that the data associated with the GUID is stored in the target node. It is important to note that any given node in the overlay network may operate as both a target node (i.e., stores data) and as a root node (i.e., maintains a DHT). Typically, a given root node is only responsible for a certain range of GUIDs.

SUMMARY

In general, in one aspect, the invention relates to a method for re-routing a request in a distributed system, comprising sending the request for an originating object, receiving the request at a root node of the originating object, determining whether the root node comprises a first forwarding pointer associated with the originating object, determining a first target object using the first forwarding pointer, if the first forwarding pointer is associated with the originating object, and re-routing the request to the first target object, wherein the distributed system implements an overlay network for message delivery.

In general, in one aspect, the invention relates to a method for re-routing a request in a distributed system, comprising sending the request for an originating object, receiving the request at a root node of the originating object, determining whether the root node comprises a first forwarding pointer associated with the originating object, determining at least two of target objects using the first forwarding pointer, if the first forwarding pointer is associated with the originating object, wherein determining the at least two target objects comprises using forwarding information in the first forwarding pointer, and re-routing the request to the at least two target objects, wherein the distributed system implements an overlay network for message delivery, wherein the forwarding information comprises a plurality of target objects, wherein the at least two target objects are selected from the plurality of target objects, and an algorithm to select at least two of the plurality of target objects.

In general, in one aspect, the invention relates to a distributed system, comprising a client configured to request an originating object, a root node of the originating object configured to receive the request, determine whether the root node comprises a first forwarding pointer associated with the originating object, determine a first target object using the first forwarding pointer, if the first forwarding pointer is associated with the originating object, and re-route the request to the first target object, wherein the distributed system implements an overlay network for message delivery.

In general, in one aspect, the invention relates to a computer readable medium comprising software instructions for re-routing a request in a distributed system, comprising software instructions to send a request for an originating object, receive the request at a root node of the originating object, determine whether the root node comprises a first forwarding pointer associated with the originating object, determine a first target object using the first forwarding pointer, if the first forwarding pointer is associated with the originating object, and re-route the request to the first target object, wherein the distributed system implements an overlay network for message delivery.

Other aspects of the invention will be apparent from the following description and the appended claims.

DETAILED DESCRIPTION

Figure 1:
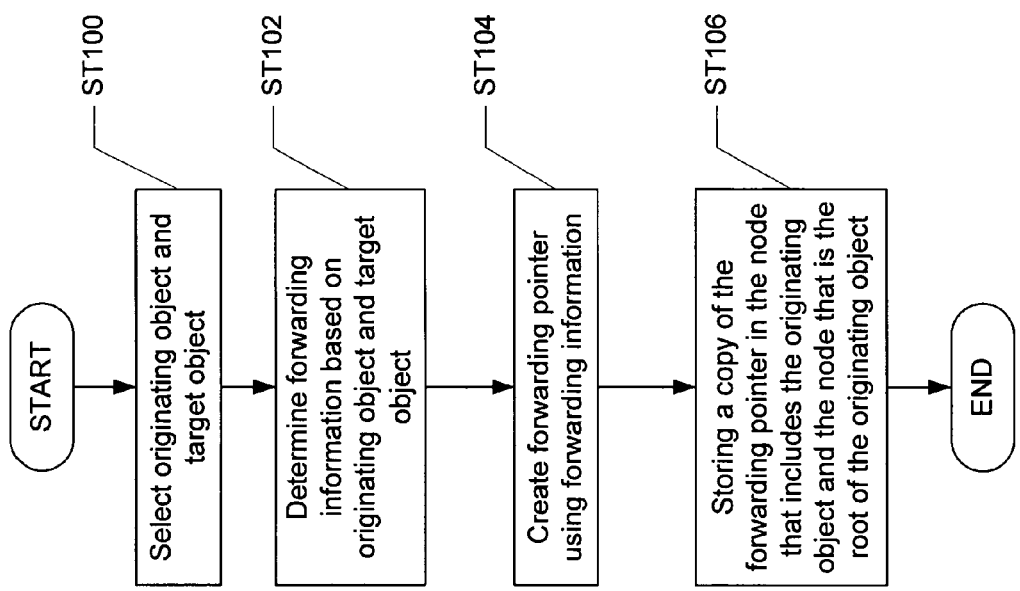
FIGS. 1 and 2 show flow charts in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the inventions relates to a method and system for re-routing a request in a distributed system. More specifically, embodiments of the invention provide a method and system for re-routing request from an originating object to a target object. Further, embodiments of the invention use a forwarding pointer to determine to which target object to re-route the request.

Embodiments of the invention enable transparent re-routing of requests within a distributed system. Further, embodiments of the invention enable re-routing of requests within a distributed system implementing an overlay network using DHT.

FIG. 1 shows a flowchart in accordance with one embodiment of the invention. More specifically, FIG. 1 shows a method for setting-up a system to implement one or more embodiments of the invention. Initially, an originating object and a target object are selected (ST100). In one embodiment of the invention, the originating object corresponds to the object that was originally requested and the target object corresponds to the object that will service the request. Said another way, the request is re-routed from the original object to the target object.

In one embodiment of the invention, instead of selecting a single target object, multiple target objects exist. During the implementation of the invention, one of multiple target objects are selected to service the request (discussed below). Once the originating object and the target object (or multiple target objects) have been selected, forwarding information is determined (ST102).

In one embodiment of the invention, if a single target object is selected in ST100, then the forwarding information corresponds to the information necessary to re-route the request from the originating object to the target object. In one embodiment of the invention, the forwarding information may include the GUID associated with the target object.

Alternatively, if multiple target objects are selected in ST100, then the forwarding information may include the GUIDs of each of the target objects as well as an algorithm that is used to determine to which of the target objects to re-route the request. In one embodiment of the invention, the algorithm may take information such as, the name or state of the requesting entity (i.e., the client), as input, and determine to which of the target objects to re-route the request.

Continuing with the discussion of FIG. 1, once the forwarding information has been determined, a forwarding pointer is created (ST104). In one embodiment of the invention, the forwarding pointer may include the forwarding information, authentication material, an expiry information, etc. In one embodiment of the invention, the authentication material may correspond to any authentication material, such as a digital signature, which may be used to authenticate that the owner of the originating object (or an entity trusted by the owner of the originating object) created the forwarding pointer. The inclusion of authentication material in the forwarding pointer acts to deter non-owners of the originating object from creating a forwarding pointer associated with the originating object. In one embodiment of the invention, the inclusion of the expiry information in the forwarding pointer sets a time limit during which the forwarding pointer is valid. Once the time period expires the forwarding pointer is no longer valid, i.e., the forwarding pointer cannot be used to re-route messages from the originating object to a target object. Those skilled in the art will appreciate that the expiry information may include the date on which the forwarding pointer expires as well as the specific time (possibly corresponding to a specific time zone) on that date when the forwarding pointer expires.

Once the forwarding pointer has been created, a copy of the forwarding pointer is stored on the node which currently includes the originating object (hereafter "the originating node") and a copy of the forwarding pointer is stored in the root node of the originating object (hereafter "the root") (ST106).

Those skilled in the art will appreciate that in some implementations of the invention, the forwarding pointer is initially stored in the originating node. The originating node subsequently publishes possession of the forwarding pointer. The root, upon receiving the publication message, obtains and stores the forwarding pointer associated with the originating object. If the above mechanism of publishing the possession of the forwarding pointer is used, then there may be certain instances (e.g., forwarding pointer updated in the originating node but updated forwarding pointer has not reached the root, etc.) during which the forwarding pointer stored on the originating node is different than the forwarding pointer stored on the root. Those skilled in the art will appreciate that the above mechanism for publishing possession of the forwarding pointer may also be used to provide a new root of the originating object with the forwarding pointer in the case where the previous root of the originating object is no longer accessible. The previous root of the originating object may not be accessible because the originating node and the previous root may become partitioned (i.e., no longer able to communicate using the distributed system and overlay network).

Figure 2:
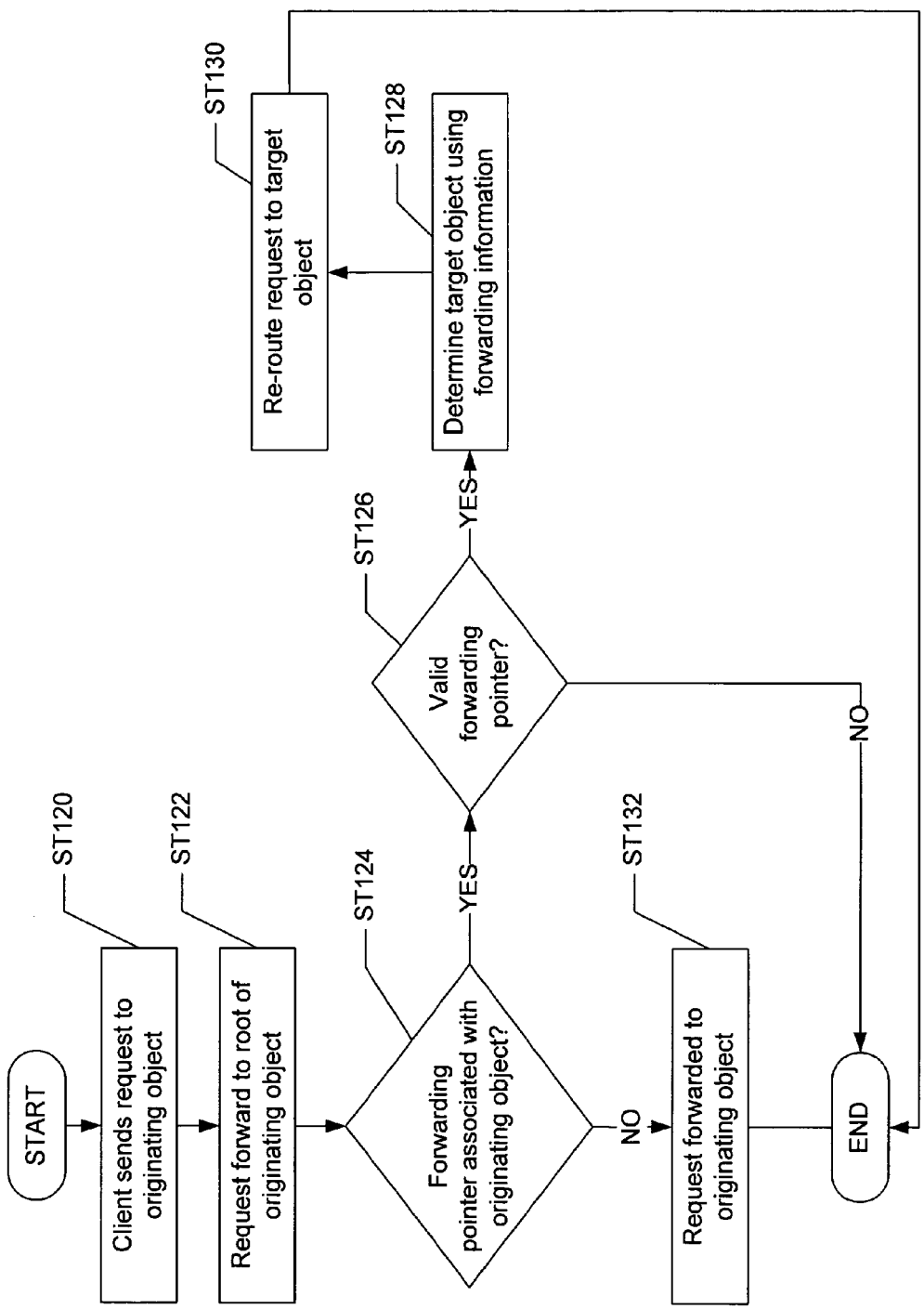

FIG. 2 shows a flowchart in accordance with one embodiment of the invention. More specifically, FIG. 2 shows a method for implementing the invention in accordance with one embodiment of the invention. Initially, a client (e.g., a node) sends a request for an originating object (ST120). In one embodiment of the invention, the request includes a GUID (or information that may be used to locate the originating object in the distributed network). The request is subsequently forwarded (through the overlay network) to the root (ST122). In one embodiment of the invention, the overlay network uses DHT to forward the request from the client to the root. A determination is then made whether the originating object is associated a forwarding pointer (ST124). In one embodiment of the invention, the root is initially queried to determine the presence of a forwarding pointer associated with the originating object. In some cases, a second query may be performed to determine whether there is a forwarding pointer associated with the originating object on the originating node. The second query is typically performed if no forwarding pointer is located on the root.

If no forwarding pointer is associated with the originating object (either on the root or the originating node), then no re-routing occurs and the request is serviced by the originating object (ST132). Alternatively, if the originating object is associated with a forwarding pointer, then the root (or an associated process) proceeds to determine whether the forwarding pointer stored in the root is valid (ST126). In one embodiment of the invention, determining whether the forwarding pointer is valid may include, but is not limited to: (1) determining whether the forwarding pointer has expired using the expiry information, (2) determining whether the forwarding pointer is authentic by reviewing the authentication materials associated with the forwarding pointer, (3) determining whether the forwarding pointer on the root is the same as the forwarding pointer associated with the originating object located on the originating node, etc.

Though not shown in FIG. 2, if the forwarding pointer stored in the root is not valid then, in one embodiment of the invention, a subsequent determination is made whether there is a forwarding pointer stored in the originating node, which is different than the forwarding pointer stored on the root. If there is a different forwarding pointer stored in the originating node, then a determination is made whether the forwarding pointer is valid (as described above). In the aforementioned embodiment, the forwarding pointer on the originating node has precedence over the forwarding pointer stored in the root.

If the forwarding pointer on the originating node is valid, then the forwarding pointer is forwarded to the root. The root subsequently stores the forwarding pointer received from the originating node. In some cases, the forwarding pointer received from the originating node replaces the current forwarding pointer associated with originating object stored on the root.

Continuing with the discussion of FIG. 2, once the root and/or the originating node has determined that the forwarding pointer is valid, then the target object is determined using the forwarding information within the forwarding pointer (ST128). As discussed above, the forwarding information may include the GUID (or other information necessary to locate the target object) of the target object. Alternatively, the forwarding information may correspond to an algorithm which is used to determine to which of a number target objects the request should be re-routed. In this embodiment, the root (or associated process) typically includes the necessary functionality to obtain the inputs (whatever they may be) to the algorithm. The algorithm subsequently determines the target object. Once the target object has been determined, the request is re-routed to the target object (ST130). Those skilled in the art will appreciate that the algorithm may include functionality to select multiple target objects (i.e., the request may be re-routed to more than one target object). Those skilled in the art will appreciate that the request may be re-routed to multiple target objects using anycast, multicast, etc.

Those skilled in the art will appreciate that a given root may include forwarding pointer for more than one originating object. Further, those skilled in the art will appreciate that the target object may also be an originating object. Thus, a client may send a request to a first originating object. The forwarding pointer associated with the first originating object may then re-route the request to a first target object. The first target object in turn is associated with the forwarding pointer. Thus, when the re-routed request is received by the first target object, the request is re-routed from the first target object to a second target object. The aforementioned re-routing may include any number of re-routing steps.

In view of the above, a chain of nodes may be established to allow uni-directional and bi-directional traffic. Further, the messages communicated between the nodes in the chain may be encrypted using authentication material (i.e., public keys, private keys, etc.) which are only known by nodes in the chain.

Those skilled in the art will also appreciate that the re-routing may be bi-directional. Specifically, a target object may use information in the forwarding pointers to re-route a response back to the client. In one embodiment of the invention, each node involved in the bi-directional transfer of data would receive information necessary to re-route and receive messages to/from adjacent nodes involved in the bi-directional transfer. Those skilled in the art will appreciate that the response to the client does not need to travel on the same path as the request to the target object. Further, the forwarding pointers do not necessarily need to include information that allows bi-directional re-routing; rather, the bi-directional transfer of information may be achieved using two sets of pointer one set moving data in each direction. In addition, the information necessary to route a message from the target object to the client may include generating forwarding pointers (or populating pre-existing pointers with the necessary information) dynamically (i.e., during the routing process).

Figure 3:
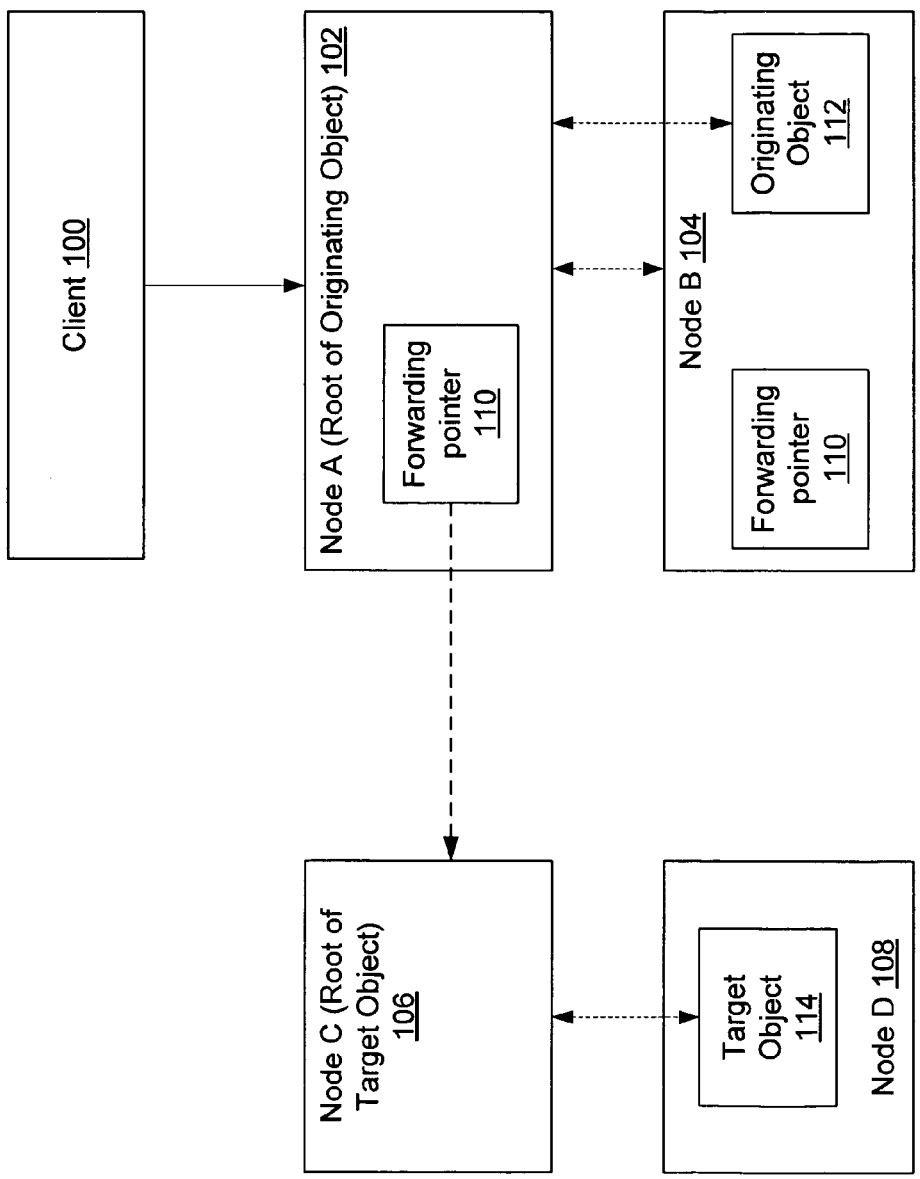
FIG. 3 shows an example of a system implementing one or more embodiments of the invention.

FIG. 3 shows an example of a system implementing one or more embodiments of the invention. The system includes a client (100), Node A (102), Node B (104), Node C (106), and Node D (108). The client (100) and each of the aforementioned nodes are connected via a distributed network (not shown). Further, in one embodiment of the invention, the message communicated between the client (100) and the aforementioned nodes (i.e., Node A (102), Node B (104), Node C (106), and Node D (108)) are routed through the distributed network using an overlay network implementing DHT.

In the system shown in FIG. 3, Node A (102) is the root of the originating object (112), which is stored on Node B (104). In addition, the originating object (112) is associated with a forwarding pointer (110), a copy of which is located on both Node A (102) and Node B (104). The forwarding pointer (110) includes the necessary information to re-route a request for the originating object (112) to a target object (114). In the system shown in FIG. 3, the target object is stored on Node D (108) and Node C (106) is the root of the target object (114).

In accordance with one or more embodiments discussed above, the following steps occur when the client (100) requests the originating object (112). Initially, the client (100) sends the request through the distributed network (101). The request is eventually forwarded to the Node A (102) (i.e., the root of the originating object (112)). Node A (102) (or an associated entity) determines whether a forwarding pointer is associated with the originating object (112). In this particular instance, a forwarding pointer is associated with the originating object (i.e., forwarding pointer 110). Node A (102) (or an associated entity) subsequently determines whether the forwarding pointer (110) is valid (as discussed above).

Once Node A (102) has determined that the forwarding pointer (110) is valid, Node A (102) (or an associated entity) determines the target object (114) to which to re-route the request (as discussed above). Once the target object (114) has been determined, Node A (102) re-routes the request to Node C (106) (i.e., the root of target object (114)). Node C (106) then proceeds to forward the request to target object (114).

Figure 4:
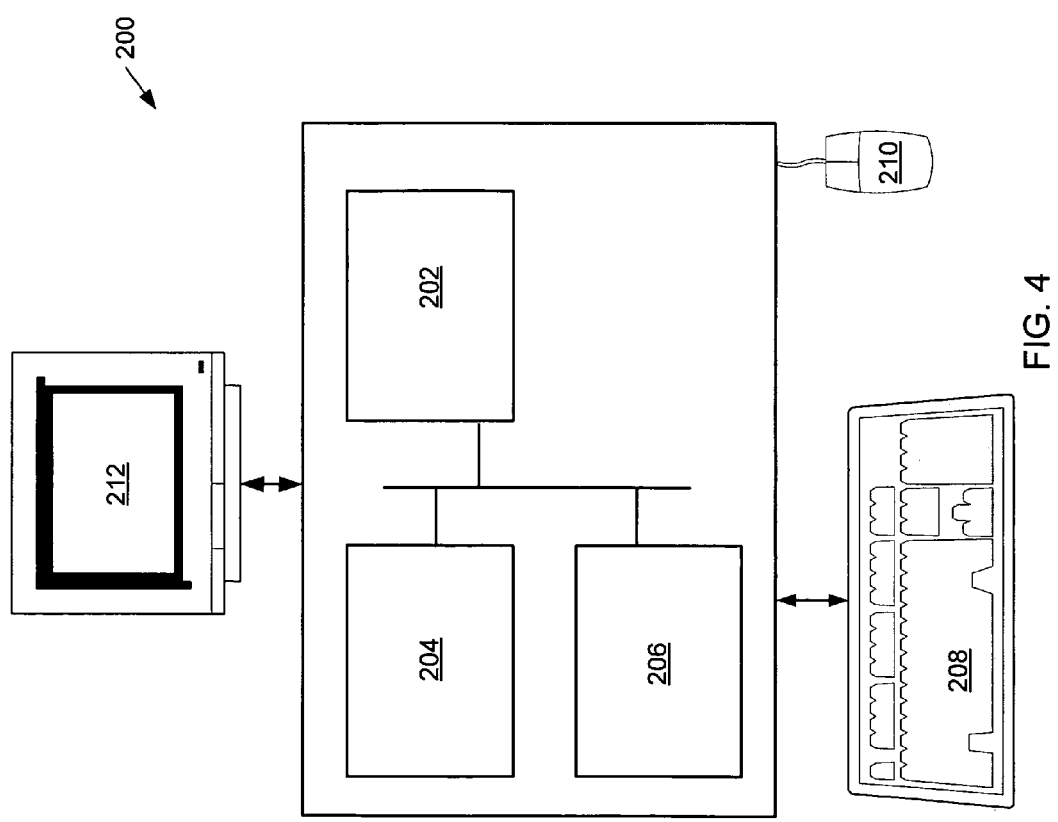
FIG. 4 shows a computer system in accordance with one embodiment of the invention.

An embodiment of the invention may be implemented on virtually any type of computer regardless of the platform being used. For example, as shown in FIG. 4, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for re-routing a request in a distributed system, comprising:
   sending the request for an originating object;
   receiving the request at a root node of the originating object;
   determining whether the root node comprises a first forwarding pointer associated with the originating object;
   determining a first target object using the first forwarding pointer, if the root node comprises the first forwarding pointer associated with the originating object;
   re-routing the request to the first target object,
   wherein the distributed system implements an overlay network for message delivery, and
   wherein the originating object is within a node comprising a copy of the first forwarding pointer; and
   communicating the copy of the first forwarding pointer to a new root node of the originating object when the root node and the originating object become partitioned.

2. The method of claim 1, further comprising:
   validating the first forwarding pointer prior to determining the first target object.

3. The method of claim 2, wherein validating the first forwarding pointer comprises verifying authentication material associated with the first forwarding pointer.

4. The method of claim 2, wherein validating the first forwarding pointer comprises verifying that the first forwarding pointer has not expired using expiry information associated with the first forwarding pointer.

5. The method of claim 2, further comprising:
   obtaining a valid first forwarding pointer associated with the originating object, if the first forwarding pointer associated with the originating object is not valid.

6. The method of claim 1, further comprising:
   receiving the request at a root node of the first target object;
   determining whether the root node of the first target object comprises a second forwarding pointer associated with the first target object;
   determining a second target object using the second forwarding pointer, if the second forwarding pointer is associated with the second target object; and
   re-routing the request to the second target object.

7. The method of claim 1, wherein determining the first target object comprises using forwarding information in the first forwarding pointer.

8. The method of claim 7, wherein forwarding information comprises an address of the first target object.

9. The method of claim 7, wherein the forwarding information comprises a plurality of target objects, wherein the first target object is one of the plurality of target objects, and an algorithm to select one of the plurality of target objects.

10. The method of claim 9, wherein the algorithm uses at least one selected from the group consisting of a client state and a client name, to select the one of the plurality of target objects.

11. The method of claim 1, wherein the forwarding pointer further comprises an expiry information and authentication material.

12. The method of claim 1, wherein the first forwarding pointer comprises information necessary to locate a root node of the first target object.

13. A distributed system, comprising:
   a client configured to send a request for an originating object;
   a root node of the originating object configured to:
      receive the request;
      determine whether the root node comprises a first forwarding pointer associated with the originating object;
      determine a first target object using the first forwarding pointer, if the root node comprises the first forwarding pointer associated with the originating object; and
      re-route the request to the first target object; and
   a node comprising the originating object and a copy of the first forwarding pointer,
   wherein the distributed system implements an overlay network for message delivery, and
   wherein the copy of the first forwarding pointer is communicated to a new root node of the originating object when the root node and the node comprising the originating object become partitioned.

14. The system of claim 13, wherein the root node of the originating object is further configured to:
   validate the first forwarding pointer prior to determining the first target object.

15. The system of claim 13, wherein the root node of the originating object is further configured to:
   obtain a valid first forwarding pointer associated with the originating object, if the first forwarding pointer associated with the originating object is not valid.

16. The system of claim 13, wherein the root node of the originating object is further configured to:
   receive the request at a root node of the first target object;
   determine whether the root node of the first target object comprises a second forwarding pointer associated with the first target object;
   determine a second target object using the second forwarding pointer, if the second forwarding pointer is associated with the second target object; and
   re-route the request to the second target object.

17. The system of claim 13, wherein the overlay network comprises a distributed hash table.

18. A method for re-routing a request in a distributed system, comprising:
   sending the request for an originating object;
   receiving the request at a root node of the originating object;
   determining whether the root node comprises a first forwarding pointer associated with the originating object;
   determining at least two of target objects using the first forwarding pointer, if the root node comprises the first forwarding pointer associated with the originating object, wherein determining the at least two target objects comprises using forwarding information in the first forwarding pointer; and
   re-routing the request to the at least two target objects,
   wherein the distributed system implements an overlay network for message delivery,
   wherein the forwarding information comprises a plurality of target objects, wherein the at least two target objects are selected from the plurality of target objects, and an algorithm to select at least two of the plurality of target objects,
   wherein the originating object is within a node comprising a copy of the first forwarding pointer, and
   wherein the copy of the first forwarding pointer is communicated to a new root node of the originating object when the root node and the node comprising the originating object become partitioned.

19. A computer readable medium comprising software instructions for re-routing a request in a distributed system, comprising software instructions to:

send a request for an originating object;
receive the request at a root node of the originating object;
determine whether the root node comprises a first forwarding pointer associated with the originating object;
determine a first target object using the first forwarding pointerwhen the root node comprises the first forwarding pointer associated with the originating object; re-route the request to the first target object,
wherein the distributed system implements an overlay network for message delivery, and
wherein the originating object is within a node comprising a copy of the first forwarding pointer; and
communicate the copy of the first forwarding pointer to a new root node of the originating object when the root node and the originating object become partitioned.

20. The computer readable medium of claim 19, further comprising software instructions to validate the first forwarding pointer prior to determining the first target object.

21. The computer readable medium of claim 19, further comprising software instructions to obtain a valid first forwarding pointer associated with the originating object, if the first forwarding pointer associated with the originating object is not valid.

22. The computer readable medium of claim 19, further comprising software instructions to:
receive the request at a root node of the first target object;
determine whether the root node of the first target object comprises a second forwarding pointer associated with the first target object;
determine a second target object using the second forwarding pointer, if the second forwarding pointer is associated with the second target object; and
re-route the request to the second target object.

23. The computer readable medium of claim 19, wherein the overlay network comprises a distributed hash table.

* * * * *